US011405336B2

(12) United States Patent
Liu et al.

(10) Patent No.: US 11,405,336 B2
(45) Date of Patent: Aug. 2, 2022

(54) METHOD FOR KEY SHARING BETWEEN ACCELERATORS IN VIRTUAL CHANNEL WITH SWITCH

(71) Applicant: Baidu USA LLC, Sunnyvale, CA (US)

(72) Inventors: Yong Liu, Sunnyvale, CA (US); Yueqiang Cheng, Sunnyvale, CA (US)

(73) Assignees: BAIDU USA LLC, Sunnyvale, CA (US); KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 150 days.

(21) Appl. No.: 16/692,980

(22) Filed: Nov. 22, 2019

(65) Prior Publication Data

US 2021/0160197 A1     May 27, 2021

(51) Int. Cl.
| | |
|---|---|
| *H04L 49/00* | (2022.01) |
| *H04L 49/354* | (2022.01) |
| *H04L 9/40* | (2022.01) |
| *H04L 9/08* | (2006.01) |

(52) U.S. Cl.
CPC ............ *H04L 49/70* (2013.01); *H04L 9/0838* (2013.01); *H04L 9/0863* (2013.01); *H04L 49/354* (2013.01); *H04L 63/061* (2013.01)

(58) Field of Classification Search
CPC ........ G06F 3/062; G06F 3/0655; G06F 13/28; G06F 13/102; H04L 9/3242; H04L 45/586; H04L 9/0825
See application file for complete search history.

(56) References Cited

U.S. PATENT DOCUMENTS

| | | | |
|---|---|---|---|
| 642,945 | A | 2/1900 | Wright |
| 6,426,945 | B1 | 7/2002 | Sengodan |
| 10,813,001 | B1 | 10/2020 | Ibarra |
| 2004/0143645 | A1 | 7/2004 | Cheenath |
| 2006/0248142 | A1 | 11/2006 | Ishizaki et al. |
| 2009/0172411 | A1 | 7/2009 | Kershaw et al. |
| 2010/0254537 | A1 | 10/2010 | Buer |
| 2011/0072270 | A1 | 3/2011 | Little et al. |
| 2011/0113244 | A1 | 5/2011 | Chou et al. |
| 2014/0156989 | A1 | 6/2014 | Lalwani et al. |

(Continued)

*Primary Examiner* — Iqbal Zaidi
(74) *Attorney, Agent, or Firm* — Womble Bond Dickinson (US) LLP

(57) ABSTRACT

A host processing device instructs a plurality of virtual data processing (VDP) accelerators, configured on each of a plurality of data processing accelerators. The VDP accelerators configure themselves for secure communications. The host device generates an adjacency table of each of the plurality of VDP accelerators. Then the host device then establishes a session key communication with each VDP accelerator and sends the VDP accelerator a list of other VDP accelerators that the VDP accelerator is to establish a session key with, for secure communications between the VDP accelerators. The VDP accelerator establishes a different session key for each pair of the plurality of VDP accelerators. When all DP accelerators have established a session key for communication with other VDP accelerators, according to the respective list of other VDP accelerators sent by the host device, then the host device can assign work tasks for performance by a plurality of VDP accelerators, each communicating over a separately secured virtual communication channel.

20 Claims, 10 Drawing Sheets

(56) References Cited

U.S. PATENT DOCUMENTS

| | | |
|---|---|---|
| 2015/0195264 A1 | 7/2015 | Finlayson |
| 2015/0358294 A1 | 12/2015 | Kancharla |
| 2016/0044001 A1 | 2/2016 | Pogorelik |
| 2016/0127341 A1 | 5/2016 | Yan |
| 2016/0330301 A1 | 11/2016 | Raindel |
| 2018/0225237 A1* | 8/2018 | Edirisooriya ........... G06F 9/546 |
| 2018/0343258 A1 | 11/2018 | Spies et al. |
| 2019/0140979 A1* | 5/2019 | Levi .................... G06F 9/45558 |
| 2019/0230094 A1 | 7/2019 | Pletea et al. |
| 2019/0303344 A1 | 10/2019 | Kong et al. |
| 2020/0073734 A1* | 3/2020 | Wang ...................... G06F 15/17 |
| 2020/0133929 A1 | 4/2020 | Yamashita |
| 2020/0323024 A1 | 10/2020 | Huang et al. |
| 2020/0389322 A1 | 12/2020 | Selander et al. |
| 2021/0176632 A1 | 6/2021 | Liu |

* cited by examiner

| HOST_104 ADJACENCY TABLE 500 | | |
|---|---|---|
| VID 501 | Session Key 504 | Context Info. 505 |
| DPA_105_ID | 0xF7194B22... | |
| VDPA_105A_ID | 0x4597A4D5... | Caller=Host_104_ID:Process_ID<br>Caller_Status=Waiting on result from VDPA_105A |
| VDPA_105B_ID | 0x12F7B475... | ... |
| VDPA_105C_ID | 0x98B5C25D... | ... |
| VDPA_105D_ID | 0x39EAFD11... | ... |
| DPA_106_ID | 0xB275C413... | |
| VDPA_106A_ID | 0x51BF2318... | Caller: VDPA_105A<br>Caller_Status = Waiting on result(s)<br>VDPA_106A Status=executing |
| VDPA_106B_ID | 0x6623FD79... | ... |
| VDPA_106C_ID | 0x2FE3D461... | ... |
| VDPA_106D_ID | 0x7EB429CA... | ... |
| DPA_107_ID | 0x55FE19D2... | |
| VDPA_107A_ID | 0x41D2C3FB... | Caller: Null<br>VPDA_107A Status=idle |
| VDPA_107B_ID | 0x8A1F7D04... | ... |
| VDPA_107C_ID | 0xBE129746... | ... |
| VDPA_107D_ID | 0xA633BD79... | ... |

| SWITCH_109 ADJACENCY TABLE 510 | | |
|---|---|---|
| VID 501 | Port 502 | Virt. Chnl 503 |
| DPA_105_ID | 0 | 0.0 |
| VDPA_105A_ID | 0 | 0.1 |
| VDPA_105B_ID | 0 | 0.2 |
| VDPA_105C_ID | 0 | 0.3 |
| VDPA_105D_ID | 0 | 0.4 |
| DPA_106_ID | 1 | 1.0 |
| VDPA_106A_ID | 1 | 1.1 |
| VDPA_106B_ID | 1 | 1.2 |
| VDPA_106C_ID | 1 | 1.3 |
| VDPA_106D_ID | 1 | 1.4 |
| DPA_107_ID | 2 | 2.0 |
| VDPA_107A_ID | 2 | 2.1 |
| VDPA_107B_ID | 2 | 2.2 |
| VDPA_107C_ID | 2 | 2.3 |
| VDPA_107D_ID | 2 | 2.4 |
| HOST_104_ID | 8 | N/A |

FIG. 5A

| VDPA_105B ADJACENCY TABLE 520 | | |
|---|---|---|
| VID 511 | Session Key 514 | Context Information 505 |
| HOST_104_ID | 0x12F7B475... | ... |
| VDPA_106B_ID | 0x6E42B318... | ... |
| VDPA_107B_ID | 0x41CE8921... | ... |

| VDPA_106B ADJACENCY TABLE 521 | | |
|---|---|---|
| VID 511 | Session Key 514 | Context Information 505 |
| HOST_104_ID | 0x6823FD79... | ... |
| VDPA_105B_ID | 0x6E42B318... | ... |
| VDPA_107B_ID | 0xB41A23FE... | ... |

FIG. 5B

METHOD FOR KEY SHARING BETWEEN ACCELERATORS IN VIRTUAL CHANNEL WITH SWITCH

TECHNICAL FIELD

Embodiments of the present disclosure relate generally to artificial intelligence model training and inference. More particularly, embodiments of the disclosure relate to sharing keys between data processing accelerators configured to communicate with each other.

BACKGROUND

Data processing accelerators (DPAs) that are configured to communicate with a host computing device generally cannot communicate securely with each other. Communication, e.g. peer-to-peer communication, between DPAs is useful so that two or more DPAs can cooperate and coordinate to perform a data processing task on behalf of a host computing device. However, it is important that DPAs communicate securely so that the processing task performed by cooperating DPAs is performed securely such that another computing entity may not alter a result produced by the communicating DPAs, and may not steal code or data from any of the communicating DPAs.

BRIEF DESCRIPTION OF THE DRAWINGS

Embodiments of the disclosure are illustrated by way of example and not limitation in the figures of the accompanying drawings in which like references indicate similar elements.

FIGS. 5A and 5B are block diagrams illustrating secure communications adjacency tables between a host device and a plurality of virtual data processing accelerators, and a switch that supports virtual communication channels, and between virtual data processing accelerators, when communicating via a switch, according to an embodiment.

DETAILED DESCRIPTION

Figure 1:
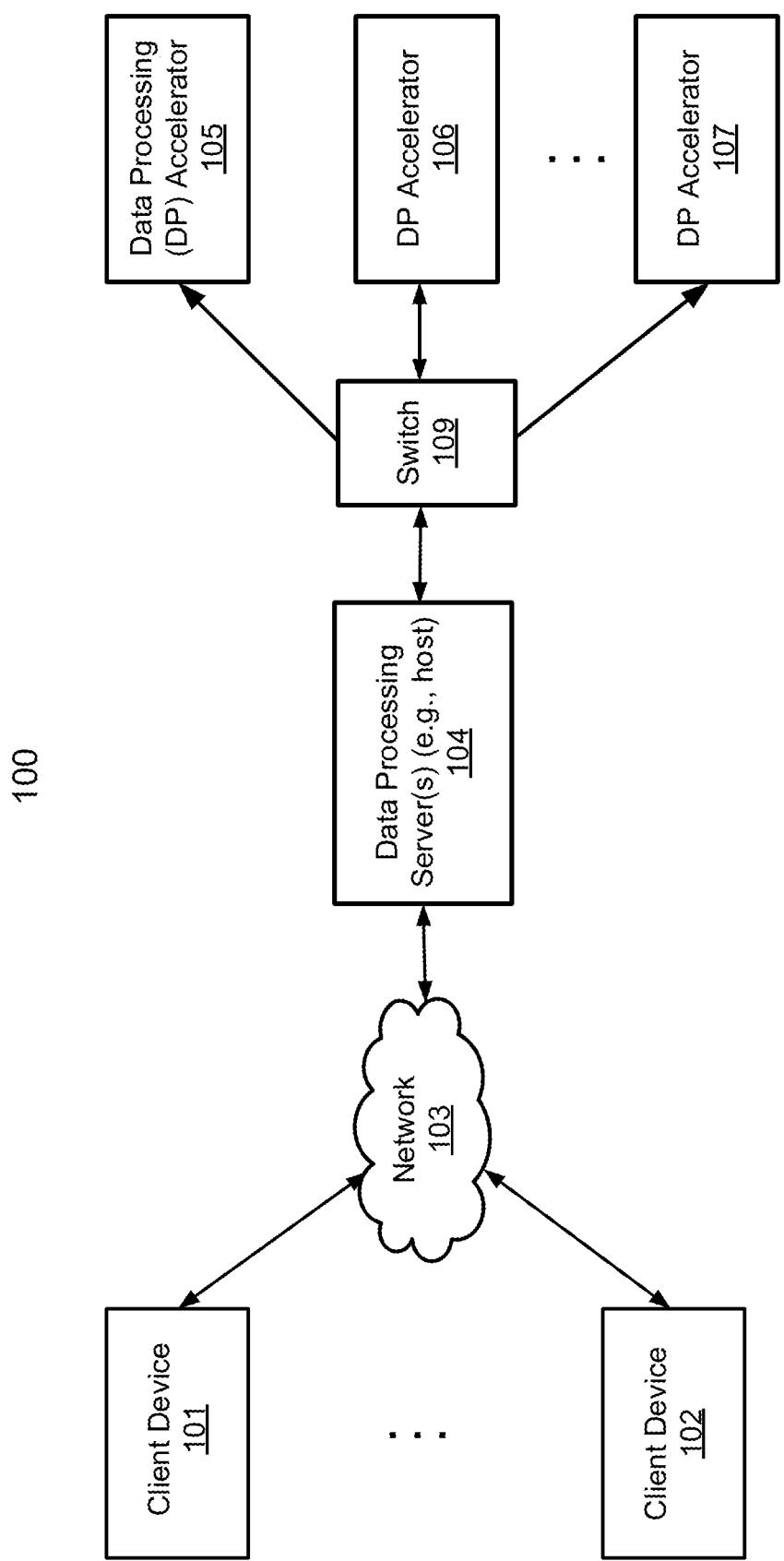
FIG. 1 is a block diagram illustrating a secure processing system, according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The following embodiments relate to usage of a data processing (DP) accelerator to increase processing throughput of certain types of operations that may be offloaded (or delegated) from a host device to one or more DP accelerators. A DP accelerator can be a graphics processing unit (GPU), an artificial intelligence (AI) accelerator, math coprocessor, digital signal processor (DSP), or other type of processor. A DP accelerator can be a proprietary design, such as a Baidu® AI accelerator, or another GPU, and the like. While embodiments are illustrated and described with host device securely coupled to one or more DP accelerators, the concepts described herein can be implemented more generally as a distributed processing system.

The host device and the DP accelerator can be interconnected via a high-speed bus, such as a peripheral component interconnect express (PCIe), or other high-speed bus. A DP accelerator can be configured to include a plurality of virtual DP (VDP) accelerators. Each of the VDP accelerators can communicate with the host via a virtual communication channel of a switch. Each of the VDP accelerators can communicate with at least one of the VDP accelerators over a different virtual communication channel. Virtual communication channels are each secured using a different session key for each virtual communication channel. A virtual communication channel is defined by the endpoints (host or VDP accelerator) of the virtual communication channel.

The host device and each VDP accelerator can exchange keys and initiate a secure virtual communication channel over the PCIe bus before performing operations of the aspects of the invention described below. Embodiments are described herein for generating one or more keys for securing communications between a host and a VDP accelerator. Embodiments are also described for securing communications between any two VDP accelerators in a plurality of VDP accelerators. In an embodiment, communications between any two VDP accelerators use one or more keys that are unique with respect to any other two VDP accelerators. Some of the operations performed by a VDP accelerator include the VDP accelerator using an artificial intelligence (AI) model to perform inferences using data provided by the host device. Before the AI model inferences are delegated to a VDP accelerator for computation, secure virtual communication channels are established between the host and VDP accelerator and between the VDP accelerator and any other VDP accelerator that may participate in the AI model inference.

In a first aspect, a computer-implemented method of a first virtual data processing (VDP) accelerator securely communicating with one or more second VDP accelerators via a switch includes receiving, by the first VDP accelerator, from a host device, via a first virtual communication channel of the switch, a list of the one or more second VDP accelerators. For each of the one or more second VDP accelerators, a session key is determined between the first VDP accelerator and the second VDP accelerator. Communication between the host and first VDP accelerator is accomplished over the first virtual communication channel of the switch. Communication between the first VDP and a second VDP is accomplished over a second virtual communication channel of the switch. The session key is stored by the first VDP accelerator in association with the second VDP accelerator, and an indication is transmitted by the first VDP accelerator, to the host device, via the first virtual communication channel, that the first VDP accelerator is configured for secure communication with each of the one or more second VDP accelerators. Similarly, the second VDP accelerator stores the session key in association with the first VDP accelerator, such as in an adjacency table of nodes (host or VDP accelerator(s)) that are communicatively accessible by the second VDP accelerator via a virtual communication channel of the switch. The switch does not know, store, or have access to, any session key established between the host and first VDP accelerator or any session key established between the first VDP accelerator and any second VDP accelerator. In an embodiment, the method further includes generating, by the first VDP accelerator, an adjacency table with an entry for each of the one or more second VDP accelerators. Each entry can include an identifier of the VDP accelerator of the line item, the session key for the VDP accelerator of the line item. Each entry can optionally include context information related to a status of the VDP accelerator. Status information can include whether the VDP accelerator of the line item is idle, is processing, or is waiting on another VDP accelerator for a result. In an embodiment, the session key generated for the first VDP accelerator and the one of the one or more second VDP accelerators is unique with respect to the first VDP accelerator and any other of the one or more second VDP accelerators. In an embodiment, each entry for one of the one or more second VDP accelerators further includes a unique identifier of the one of the one or more second VDP accelerators. The method can further include receiving, by the first VDP accelerator, from the host device, via the first virtual communication channel of the switch, a processing task to perform, and an indication of one of the one or more second VDP accelerators to perform at least a portion of the processing task. The method can further include instructing, by the first VDP accelerator, via a second virtual communication channel of the switch, the one of the one or more second VDP accelerators to perform the at least a portion of the processing task, using a message that is secured with the session key associated with the first VDP accelerator and the one of the one or more second VDP accelerators. In an embodiment, the method can further include receiving, by the first VDP accelerator, from the one of the one or more second VDP accelerators, via the second virtual communication channel of the switch, a message secured using the session key associated with the first VDP accelerator and the one of the one or more second VDP accelerators. The message can include a result from the at least a portion of the task. The first VDP accelerator, can return a message to the host, via the first virtual communication channel, the message containing a result of the processing task. The message can be secured using a session key that is associated with the first VDP accelerator and the host device.

In some embodiments, the host device can transmit a kernel to the VDP accelerator to use in performing one or more operations on behalf of the host. In this context, a kernel is a small piece of code, provided to the VDP accelerator, to be executed by the VDP accelerator to perform the intended function of the kernel. In an embodiment, a kernel is provided to the VDP accelerator by the host device as a part of performing proof-of-trust operations by the VDP accelerator that will be validated by the host device. In some embodiments, the VDP accelerator is not aware of the purpose of the kernel it executes on behalf of the host device.

In some embodiments, the kernel can be a "watermark-enabled kernel." A watermark-enabled kernel is a kernel that, when executed, is capable of extracting a watermark from an artificial intelligence (AI) model. An AI watermark is associated with a specific AI model and can be embedded or "implanted," within the AI model using several different methods. The watermark may be implanted into one or more weight variables of the one or more nodes of the AI model. In an embodiment, the watermark is stored in one or more bias variables of the one or more nodes of the AI modes, or by creating one or more additional nodes of the AI model during the training to store the watermark.

In second aspect, a host device comprises a processing system that includes one or more processors and a memory coupled to the processor to store instructions. The instructions, when executed by the processor, cause the processor to perform operations for the host device that configure a plurality of virtual data processing (VDP) accelerators for secure communication over virtual communication channels of a switch. The operations include, for each VDP accelerator in the plurality of VDP accelerators: establishing a session key between the host device and the VDP accelerator, and storing, by the host device, the session key in an adjacency table for the host, wherein each entry in the adjacency table includes: the session key and a unique identifier of the VDP accelerator. The adjacency table can further include context information relating to processing being performed by each of the VDP accelerators, and/or a status of each of the VDP accelerators. The adjacency table enables the host device to communicate securely with each VDP accelerator in the plurality of VDP accelerators, using a session key that is unique to the particular VDP accelerator that the host device is communicating with.

The operations further include the host device transmitting, to the VDP accelerator, via a switch configured with a first virtual communication channel, a list of one or more additional VDP accelerators, and an instruction that the VDP accelerator generate a unique session key for each additional VDP accelerator for securing communication between the VDP accelerator and the additional VDP accelerator in the list of one or more additional VDP accelerators. To establish the session key between the VDP accelerator and the additional VDP accelerator, the VDP accelerator and additional VDP accelerator communicate via a second virtual communication channel of the switch, independent of the host. The switch and the host do not know, store, or have access to, the session key between the first VDP accelerator and the additional VDP accelerator. The operations further include the host device receiving, from the VDP accelerator, via the switch and first virtual communication channel, an indication that the VDP accelerator has finished generating the unique session keys for communicating between the VDP accelerator and the one or more additional VDP accelerators.

Once the VDP accelerator acknowledges to the host device that the VDP accelerator has finished establishing a unique session key for secure communications for each of the additional VDP accelerators, the host device can begin assigning processing tasks to the VDP accelerator. In an embodiment, the operations further include transmitting, by the host device, to the VDP accelerator, via the first virtual communication channel, a processing task for the VDP accelerator and at least one of the one or more additional VDP accelerators to perform, the transmitting secured using the session key established for the host device and the VDP accelerator. The host device can receive, from the VDP accelerator, via the switch and first virtual communication channel, a result from the processing task. The result can be secured using the session key established for the host device and the VDP accelerator. In an embodiment, transmitting the processing task can include transmitting instructions from the host device to the VDP accelerator that a sub-task of the processing task is to be performed by a specific one of the one or more additional VDP accelerators. In an embodiment, the processing task can be one or more of: an artificial intelligence inference, encrypting or decrypting data, digitally signing data, extracting a watermark from an AI model, implanting a watermark into an AI model, implanting a watermark into an AI model inference result, or combinations of these.

Any of the above functionality can be programmed as executable instructions onto one or more non-transitory computer-readable media. When the executable instructions are executed by a processing system having at least one hardware processor, the processing systems causes the functionality to be implemented.

Any of the above functionality can be implemented by a processing system having at least one hardware processor, coupled to a memory programmed with executable instructions that, when executed, cause the processing system to implement the functionality.

FIG. 1 is a block diagram illustrating an example of system configuration for securing communication between a host 104 and data processing (DP) accelerators 105-107, via a switch 109 configured with a plurality of virtual communication channels, according to some embodiments. Referring to FIG. 1, system configuration 100 includes, but is not limited to, one or more client devices 101-102 communicatively coupled to DP server 104 (e.g. host) over network 103. Client devices 101-102 may be any type of client devices such as a personal computer (e.g., desktops, laptops, and tablets), a "thin" client, a personal digital assistant (PDA), a Web enabled appliance, a Smart watch, or a mobile phone (e.g., Smartphone), etc. Alternatively, client devices 101-102 may be other servers. Network 103 may be any type of network such as a local area network (LAN), a wide area network (WAN) such as the Internet, or a combination thereof, wired or wireless.

Server (e.g., host) 104 may be any kind of server or a cluster of servers, such as Web or cloud servers, application servers, backend servers, or a combination thereof. Server 104 further includes an interface (not shown) to allow a client such as client devices 101-102 to access resources or services (such as resources and services provided by DP accelerators via server 104) provided by server 104. For example, server 104 may be a cloud server or a server of a data center that provides a variety of cloud services to clients, such as, for example, cloud storage, cloud computing services, artificial intelligence training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client, in this example, a user application of client device 101 (e.g., Web browser, application), may send or transmit an instruction (e.g., artificial intelligence (AI) training, inference instruction, etc.) for execution to server 104 and the instruction is received by server 104 via the interface over network 103. In response to the instruction, server 104 communicates with DP accelerators 105-107 to fulfill the execution of the instruction. Server 104 can communicate with each of the DP accelerators 105-107, and each of a plurality of virtual DP (VDP) accelerators over one or more virtual communication channels of switch 109. Any DP accelerator can communicate with another DP accelerator via switch 109, independent of the host 104. Any VDP accelerator can communication with another VDP accelerator on a different DP accelerator via a virtual communication channel of the switch 109, independent of the host.

In some embodiments, the instruction from a host to a DP accelerator or VDP accelerator can be a machine learning type of instruction where DP accelerators or VDP accelerators, as dedicated machines or processors, can execute the instruction many times faster than execution by server 104. Server 104 thus can control/manage an execution job for the one or more DP accelerators or VDP accelerators in a distributed fashion. Server 104 then returns an execution result to client devices 101-102. A DP accelerator or AI accelerator may include one or more dedicated processors such as a Baidu® artificial intelligence (AI) chipset available from Baidu, Inc.® or alternatively, the DP accelerator may be an AI chipset from another AI chipset provider.

According to one embodiment, each of the applications accessing any of DP accelerators 105-107 (or VDP accelerators of the DP accelerators) hosted by data processing server 104 (also referred to as a host) may verify that the application is provided by a trusted source or vendor. Each DP accelerator can be configured as a plurality, e.g. four, virtual DP (VDP) accelerators. Thus, for example, DP accelerator 105 can be configured as four virtual DP accelerators 105A, 105B, 105C, and 105D. Each of the applications may be launched and executed within a trusted execution environment (TEE) specifically configured and executed by a central processing unit (CPU) of host 104. When an application is configured to access any one of the VDP accelerators, e.g. 105A-105D, 106A-106D, or 107A-107D, an obscured connection can be established between host 104 and the corresponding one of the VDP accelerators, such that the data exchanged between host 104 and any of the VDP accelerators is protected against attacks from malware/intrusions.

Switch 109 can be any type of switching device that is configurable for communication between at least one host and a plurality of DP accelerators. Switch 109 can support virtualization of communication channels for one or more physical communication ports of the switch. For example, a physical DP accelerator 105 may be configured with four VDP accelerators 105A-105D. A communication port of the switch 109 that is coupled to DP accelerator 105 may be configured as four virtual communication channels, such that each of VDP accelerators 105A-105D communicates over one of the virtual communication channels of the switch communication port that is coupled to DP accelerator 105. Switch 109 may be an Ethernet switch, a PCIe switch, or other high-speed bus or network topology.

Figure 2A:
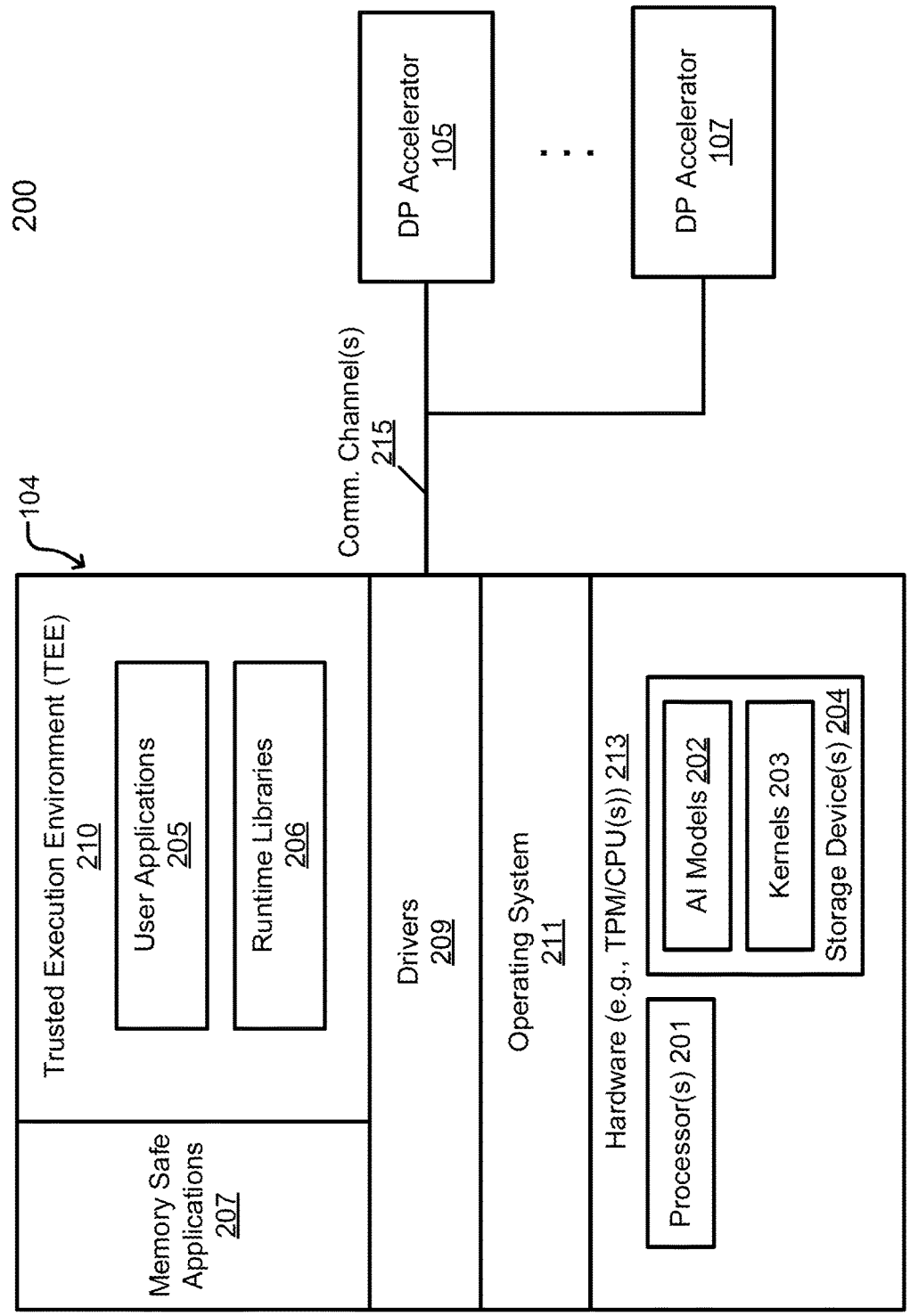
FIGS. 2A and 2B are block diagrams illustrating a secure computing environment between one or more hosts and one or more virtual data processing accelerators, according to one embodiment.

FIG. 2A is a block diagram illustrating an example of a multi-layer protection solution for obscured communications between a host system 104 and data processing (DP) accelerators 105-107 according to some embodiments. In one embodiment, system 200 provides a protection scheme for obscured communications between host 104 and DP accelerators 105-107 with or without hardware modifications to the DP accelerators. In an embodiment, each DP accelerator, e.g. 105-107, can be configured to have a plurality, e.g. four, virtual DP (VPD) accelerators, each of which communicates with host 104 via a virtual communication channel. In an embodiment, host 104 is communicatively coupled to each VDP accelerator via a virtual communication channel of a switch 109 that is configured between the host 104 and DP accelerators 105-107.

Referring to FIG. 2A, host machine or server 104 can be depicted as a system with one or more layers to be protected from intrusion such as user application(s) 205, runtime libraries 206, driver 209, operating system 211, and hardware 213 (e.g., security module (trusted platform module (TPM))/central processing unit (CPU)). Memory safe applications 207 can run in a sandboxed memory. Below the applications 205 and run-time libraries 206, one or more drivers 209 can be installed to interface to hardware 213 and/or to DP accelerators 105-107.

Hardware 213 can include one or more processor(s) 201 and storage device(s) 204. Storage device(s) 204 can include one or more artificial intelligence (AI) models 202, and one or more kernels 203. Kernels 203 can include signature kernels, watermark-enabled kernels, encryption and/or decryption kernels, and the like. A signature kernel, when executed, can digitally sign any input in accordance with the programming of the kernel. A watermark-enabled kernel can extract a watermark from a data object (e.g. an AI model or other data object). A watermark-enabled kernel can also implant a watermark into an AI model, an inference output, or other data object. A watermark kernel (e.g. a watermark inherited kernel) can inherit a watermark from another data object and implant that watermark into a different object, such as an inference output or an AI model. A watermark, as used herein, is an identifier associated with, and can be implanted into, an AI model or an inference generated by an AI model. For example, a watermark may be implanted in one or more weight variables or bias variables. Alternatively, one or more nodes (e.g., fake nodes that are not used or unlikely used by the artificial intelligence model) may be created to implant or store the watermark.

Host machine 104 is typically a CPU system which can control and manage execution of jobs on the host machine 104 and/or DP accelerators 105-107. In order to secure/ obscure a communication channel 215 between DP accelerators 105-107 and host machine 104, different components may be required to protect different layers of the host system that are prone to data intrusions or attacks. For example, a trusted execution environment (TEE) can protect the user application 205 layer and the runtime library 206 layer from data intrusions. Communication channels 215 can be configured to carry a plurality of virtual channels. For example, host 104 can communicate with DP accelerator 105 over a single physical channel 215 that includes a plurality, e.g. four, virtual communication channels 215A, 215B, 215C, and 215D. In an embodiment, the virtual communication channels 215A-215D can be time-multiplexed over physical channel communication channel 215. Each virtual communication channel can have a different session key for securing communications on the virtual communication channel than the session key of any other virtual communication channel. In an embodiment, messages sent over a virtual communication channel can be sent over a physical communication channel on a queued basis, using any of first-in-first-out, largest-out first, smallest-out first, last-in-first-out, or other queuing logic.

System 200 includes host system 104 and DP accelerators 105-107 according to some embodiments. DP accelerators can include Baidu® AI chipsets or another AI chipset such as a graphical processing units (GPUs) that can perform artificial intelligence (AI)-intensive computing tasks. Each DP accelerator can be configured as a plurality of virtual DP (VDP) accelerators in accordance with configuration instructions received from host 104. In an embodiment, the configuration instructions can be provided to each DP accelerator at, e.g., boot time, and the configuration is maintained until a next boot sequence of the host 104. In an embodiment, each VDP accelerator communicates with an adjacent host device 104 or other VDP accelerator over a virtual communication channel that is defined by the end-points (nodes) that are communicating over the virtual communication channel. For example, host 104 may communicate with DP accelerator over a physical communication channel 215 between the host 104 and a switch 109, and may further communicate over a virtual communication channel from the switch 109 to the DP accelerator, or to a VDP accelerator hosted by the DP accelerator. Host 104 can instruct DP accelerator 105, via switch 109, to configure itself as, e.g., four (4) virtual DP accelerators 105A, 105B, 105C, and 105D. Host 104 and DP accelerator 105 can configure themselves to treat communication channel 215 as, e.g., four virtual communication channels 215A, 215B, 215C, and 215D. Thus, host 104 communicates with virtual DP accelerator (VDPA) 105A using virtual communication channel 215A. Similarly, host 104 communicates with VPDA 105B over a virtual communication channel 215B, and similarly for VPDA 105C and 105D communicating over virtual communication channels 215C and 215D. Host 104 can maintain an adjacency table that relates a process running on host 104 to a corresponding virtual data processing accelerator and a session key used to secure communications between the host 104 and VDPA. In an embodiment, each session key is unique with respect to other session keys for other virtual communication channels. Switch 109 can maintain an adjacency table of unique identifiers of each DP accelerator and VDP accelerator that communication with switch 109. Switch 109 can include an adjacency table that includes a list of unique identifiers of nodes (host, DP accelerators, and VDP accelerators) and a virtual communication channel associated with each unique identifier of a DP accelerator or VDP accelerator.

In one embodiment, host system 104 includes hardware that has one or more CPU(s) 213 equipped with a security module (such as a trusted platform module (TPM)) within host machine 104. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot. The TPM chip can include a secure memory for storing keys that are rooted, e.g. in hardware, and keys that are derived from the rooted keys. In an embodiment, secure storage can include a rooted asymmetric key pair (RK): a public key (PK_RK) and a private key (SK_RK) of the asymmetric rooted key (RK) pair.

The TPM chip also includes secure driver(s) 209 and operating system (OS) 211 in a working kernel space to communicate with the DP accelerators 105-107. Here, driver 209 is provided by a DP accelerator vendor and can serve as a driver for the user application 205 to control a communication channel(s) 215 between host 104 and DP accelerators 105-107. Because the TPM chip and secure boot processor protects the OS 211 and drivers 209 in their kernel space, TPM also effectively protects the driver 209 and OS 211.

Communication channels 215 for DP accelerators 105-107 may be exclusively occupied by the OS 211 and driver 209, thus, communication channels 215 can be secured through the TPM chip. In one embodiment, communication channels 215 include a peripheral component interconnect (PCI) or peripheral component interconnect express (PCIE) channel. In one embodiment, communication channels 215 are obscured communication channels. Communication channels may be connected to one or more hardware communication ports, accessible by drivers 209, for communicating over communication channels 215 with DP accelerators 105-107. Communication channels 215 may be secured using a session key as described herein. Each communication channel 215 may be secured using a different session key than other communication channels 215. Drivers 209 may include an adjacency table that maps DP accelerators 105-107 each to a hardware communication port, and a session key associated with each hardware communication port.

Host machine 104 can include trusted execution environment (TEE) 210 which is enforced to be secure by TPM/CPU 213. A TEE is a secure environment. TEE can guarantee code and data which are loaded inside the TEE to be protected with respect to confidentiality and integrity. Examples of a TEE may be Intel® software guard extensions (SGX), or AMD® secure encrypted virtualization (SEV). Intel® SGX and/or AMD® SEV can include a set of central processing unit (CPU) instruction codes that allows user-level code to allocate private regions of memory of a CPU that are protected from processes running at higher privilege levels. Here, TEE 210 can protect user applications 205 and runtime libraries 206, where user application 205 and runtime libraries 206 may be provided by end users and DP accelerator vendors, respectively. Here, runtime libraries 206 can convert application programming interface (API) calls to commands for execution, configuration, and/or control of the DP accelerators. In one embodiment, runtime libraries 206 provide a predetermined set of (e.g., predefined) kernels for execution by the user applications. In an embodiment, the kernels may be stored in storage device(s) 204 as kernels 203.

Host machine 104 can include memory safe applications 207 which are implemented using memory safe languages such as Rust, and GoLang, etc. These memory safe applications running on memory safe Linux® releases, such as MesaLock Linux®, can further protect system 200 from data confidentiality and integrity attacks. However, the operating systems may be any Linux® distributions, UNIX®, Windows® OS, or Mac® OS.

The host machine 104 can be set up as follows: A memory safe Linux® distribution is installed onto a system equipped with TPM secure boot. The installation can be performed offline during a manufacturing or preparation stage. The installation can also ensure that applications of a user space of the host system are programmed using memory safe programming languages. Ensuring other applications running on host system 104 to be memory safe applications can further mitigate potential confidentiality and integrity attacks on host system 104.

After installation, the system can then boot up through a TPM-based secure boot. The TPM secure boot ensures only a signed/certified operating system and accelerator driver are launched in a kernel space that provides the accelerator services. In one embodiment, the operating 211 system can be loaded through a hypervisor (not shown). A hypervisor or a virtual machine manager is a computer software, firmware, or hardware that creates and runs virtual machines. A kernel space is a declarative region or scope where kernels (i.e., a predetermined set of (e.g., predefined) functions for execution) are identified to provide functionalities and services to user applications. In the event that integrity of the system is compromised, TPM secure boot may fail to boot up and instead shuts down the system.

After secure boot, runtime libraries 206 runs and creates TEE 210, which places runtime libraries 206 in a trusted memory space associated with CPU 213. Next, user application 205 is launched in TEE 210. In one embodiment, user application 205 and runtime libraries 206 are statically linked and launched together. In another embodiment, runtime library 206 is launched in TEE 210 first and then user application 205 is dynamically loaded in TEE 210. In another embodiment, user application 205 is launched in TEE 210 first, and then runtime 206 is dynamically loaded in TEE 210. Statically linked libraries are libraries linked to an application at compile time. Dynamic loading can be performed by a dynamic linker. Dynamic linker loads and links shared libraries for running user applications at runtime. Here, user applications 205 and runtime libraries 206 within TEE 210 are visible to each other at runtime, e.g., all process data are visible to each other. However, external access to the TEE is denied.

In one embodiment, the user application 205 can only call a kernel from a set of kernels as predetermined by runtime libraries 206. In another embodiment, user application 205 and runtime libraries 206 are hardened with side channel free algorithm to defend against side channel attacks such as cache-based side channel attacks. A side channel attack is any attack based on information gained from the implementation of a computer system, rather than weaknesses in the implemented algorithm itself (e.g. crypto-analysis and software bugs). Examples of side channel attacks include cache attacks which are attacks based on an attacker's ability to monitor a cache of a shared physical system in a virtualized environment or a cloud environment. Hardening can include masking of the cache, outputs generated by the algorithms to be placed on the cache. Next, when the user application finishes execution, the user application terminates its execution and exits from the TEE.

In one embodiment, TEE 210 and/or memory safe applications 207 are not necessary, e.g., user application 205 and/or runtime libraries 206 are hosted in an operating system environment of host 104.

In one embodiment, the set of kernels include obfuscation kernel algorithms. In one embodiment, the obfuscation kernel algorithms can be symmetric or asymmetric algorithms. A symmetric obfuscation algorithm can obfuscate and de-obfuscate data communications using a same algorithm. An asymmetric obfuscation algorithm requires a pair of algorithms, where a first of the pair is used to obfuscate and the second of the pair is used to de-obfuscate, or vice versa. In another embodiment, an asymmetric obfuscation algorithm includes a single obfuscation algorithm used to obfuscate a data set but the data set is not intended to be de-obfuscated, e.g., there is absent a counterpart de-obfuscation algorithm. Obfuscation refers to obscuring of an intended meaning of a communication by making the communication message difficult to understand, usually with confusing and ambiguous language. Obscured data is harder and more complex to reverse engineer. An obfuscation algorithm can be applied before data is communicated to obscure (cipher/decipher) the data communication reducing a chance of eavesdrop. In one embodiment, the obfuscation algorithm can further include an encryption scheme to further encrypt the obfuscated data for an additional layer of protection. Unlike encryption, which may be computationally intensive, obfuscation algorithms may simplify the computations. Some obfuscation techniques can include but are not limited to, letter obfuscation, name obfuscation, data obfuscation, control flow obfuscation, etc. Letter obfuscation is a process to replace one or more letters in a data with a specific alternate letter, rendering the data meaningless. Examples of letter obfuscation include a letter rotate function, where each letter is shifted along, or rotated, a predetermine number of places along the alphabet. Another example is to reorder or jumble up the letters based on a specific pattern. Name obfuscation is a process to replace specific targeted strings with meaningless strings. Control flow obfuscation can change the order of control flow in a program with additive code (insertion of dead code, inserting uncontrolled jump, inserting alternative structures) to hide a true control flow of an algorithm/AI model. Systems and methods for sharing keys used for obfuscation are described herein, below.

In summary, system 200 provides multiple layers of protection for DP accelerators (for data transmissions including machine learning models, training data, and inference outputs) from loss of data confidential and integrity. System 200 can include a TPM-based secure boot protection layer, a TEE protection layer, and a kernel validation/verification layer. Furthermore, system 200 can provide a memory safe user space by ensuring other applications on the host machine are implemented with memory safe programming languages, which can further eliminate attacks by eliminating potential memory corruptions/vulnerabilities. Moreover, system 200 can include applications that use side-channel free algorithms so to defend against side channel attacks, such as cache based side channel attacks.

Runtime 206 can provide obfuscation kernel algorithms to obfuscate data communication between a host 104 and DP accelerators 105-107. In one embodiment, the obfuscation can be pair with a cryptography scheme. In another embodiment, the obfuscation is the sole protection scheme and cryptography-based hardware is rendered unnecessary for the DP accelerators.

Figure 2B:
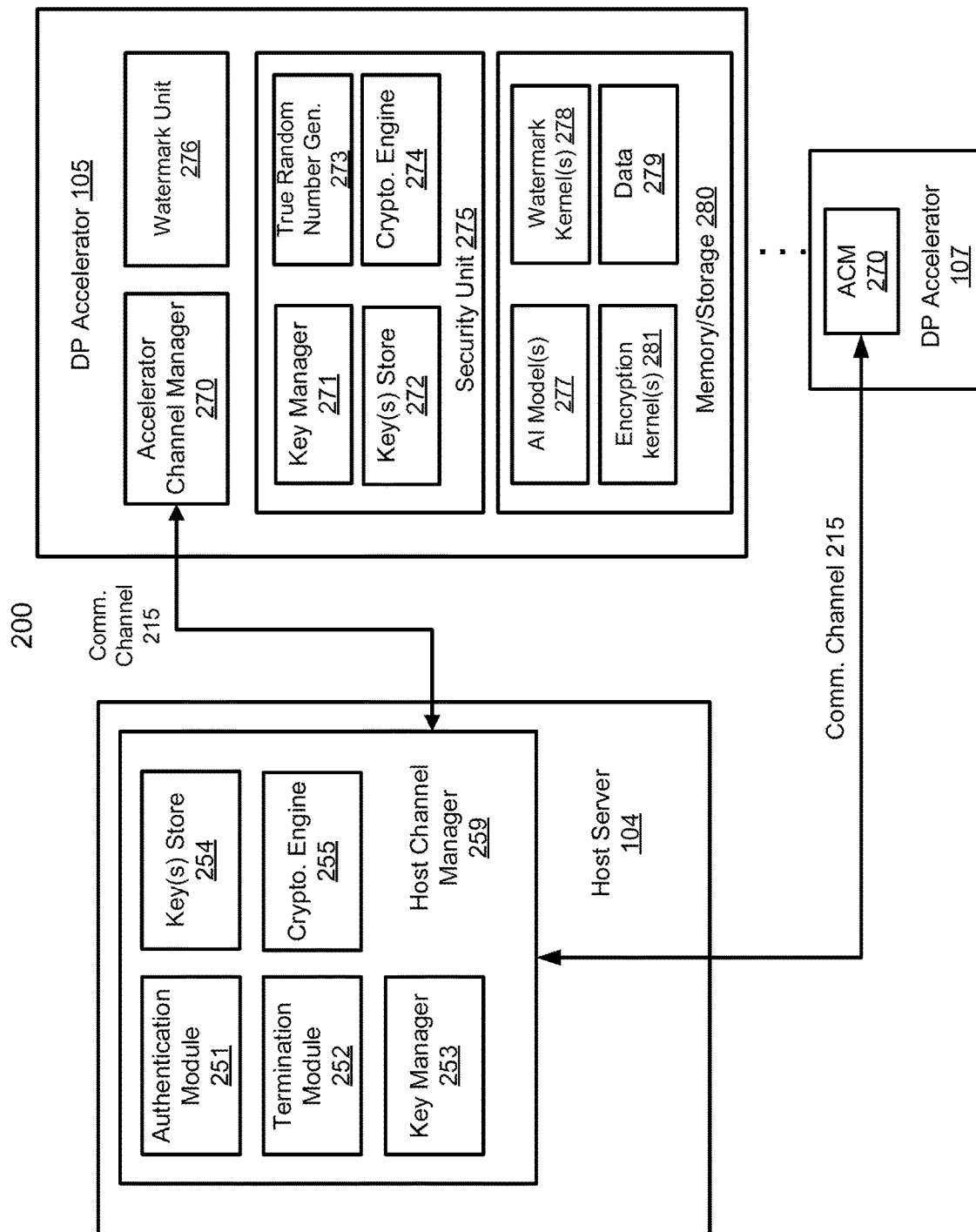

FIG. 2B is a block diagram illustrating an example of a host channel manager (HCM) 259 communicatively coupled to one or more accelerator channel managers (ACMs) 270 that interface to DP accelerators 105-107, according to some embodiments. Referring to FIG. 2B, in one embodiment, HCM 259 includes authentication module 251, termination module 252, key manager 253, key(s) store 254, and cryptography engine 255. Authentication module 251 can authenticate a user application running on host server 104 for permission to access or use a resource of a DP accelerator 105. Termination module 252 can terminate a connection (e.g., channels associated with the connection would be terminated). Key manager 253 can manage (e.g., create or destroy) asymmetric key pairs or symmetric keys for encryption/decryption of one or more data packets for different secure data exchange channels. Here, each user application (as part of user applications 205 of FIG. 2A) can correspond or map to different secure data exchange channels, on a one-to-many relationship, and each data exchange channel can correspond to a DP accelerator 105. Each application can utilize a plurality of session keys, where each session key is for a secure channel corresponding to a DP accelerator (e.g., accelerators 105-107), or for a VDP accelerator. Key(s) store 254 can store encryption asymmetric key pairs or symmetric keys. Cryptography engine 255 can encrypt or decrypt a data packet for the data exchanged through any of the secure channels. Note that some of these modules can be integrated into fewer modules.

In one embodiment, DP accelerator 105 includes ACM 270 and security unit (SU) 275. Security unit 275 can include key manager 271, key(s) store 272, true random number generator 273, and cryptography engine 274. Key manager 271 can manage (e.g., generate, safe keep, and/or destroy) asymmetric key pairs or symmetric keys. Key(s) store 272 can store the cryptography asymmetric key pairs or symmetric keys in secure storage within the security unit 275. True random number generator 273 can generate seeds for key generation and cryptographic engine 274 uses. Cryptography engine 274 can encrypt or decrypt key information or data packets for data exchanges. In some embodiments, ACM 270 and SU 275 are an integrated module.

DP accelerator 105 can further includes memory/storage 280 that can store artificial intelligence model(s) 277, watermark kernel(s) 278 (including inherited watermark kernels watermark-enabled kernels, watermark-signature kernels, et al.), encryption and decryption kernels 281, and data 279. HCM 259 can communicate with ACM 270 via communication channel 215. In an embodiment, communication channel 215 may include a switch 109 intervening between HCM 259 and ACM 270.

DP accelerator 105 can further include logic to configure one or more virtual DP accelerators hosted by DP accelerator 105. DP accelerator 105 can further include logic to virtualize a physical communication channel 215 into a plurality of virtual communication channels 215A-215D corresponding to virtual DP accelerators of DP accelerator 105. Each such virtual communication channel can have its own unique session key.

Figure 3:
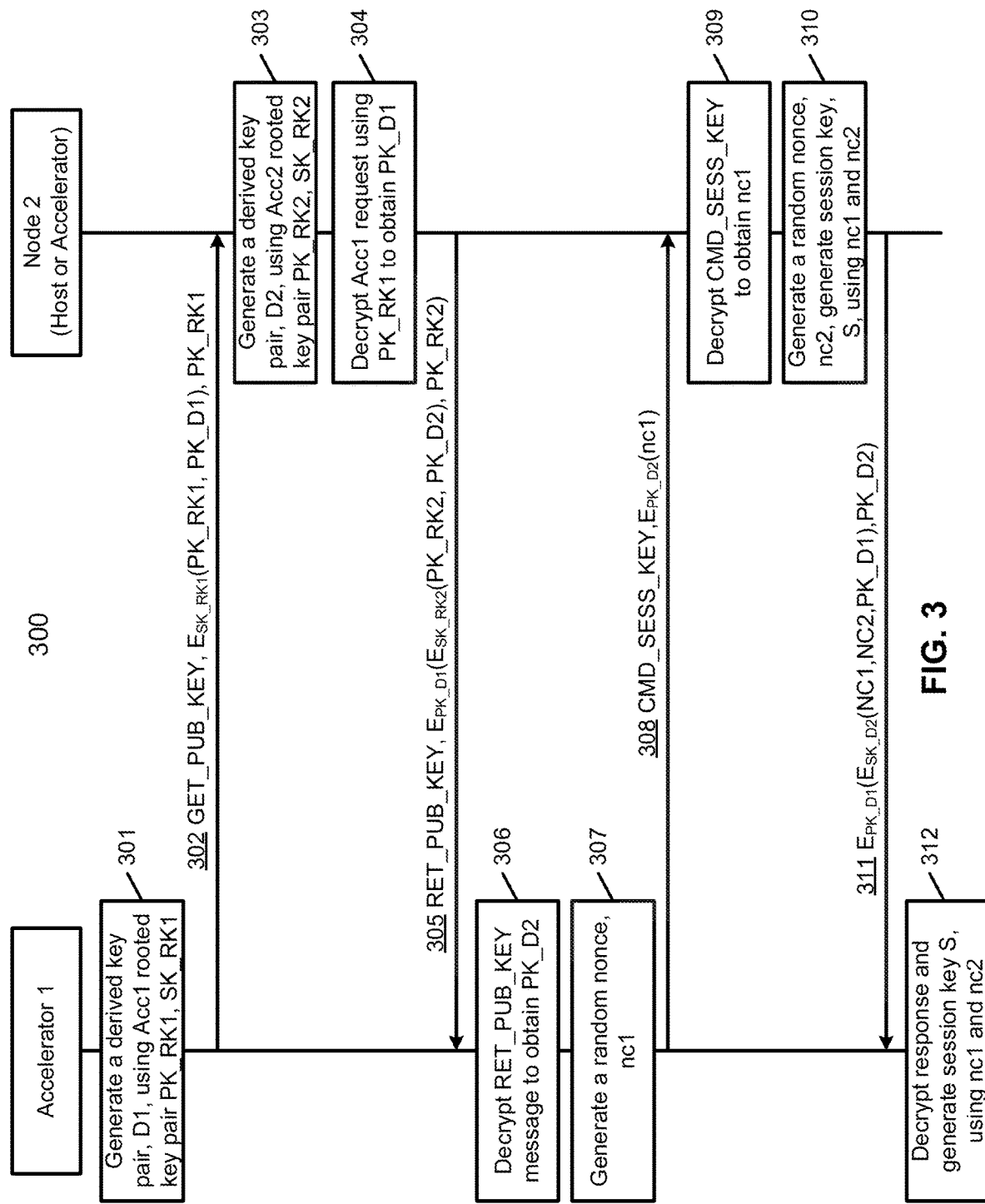
FIG. 3 is a block diagram illustrating a method of a host and virtual data processing accelerator, or two virtual data processing accelerators, generating a session key for securing communications, according to an embodiment.

FIG. 3 is a block diagrams illustrating a method 300 of a host and a virtual data processing accelerator (VDP accelerator or VDPA), or two virtual data processing accelerators, generating a session key for securing communications, according to an embodiment. Method 300 can be used between a first virtual data processing (VDP) accelerator "Accelerator 1" and a second node, "Node 2." Node 2 can be either a host device or second VDP accelerator. Accelerator 1 has a rooted key pair PK_RK1 and SK_RK1. PK_RK1 is a public key of a rooted asymmetric key pair of Accelerator 1 (RK1). SK_RK1 is a private (secret) key (SK) of rooted asymmetric key pair of Accelerator 1 (RK1). Rooted key pair RK1 is stored in a secured storage of Accelerator 1. Similarly, Node 2 (either a host or another VDP accelerator) has a rooted key pair PK_RK2 and SK_RK2. RK2 that can be stored in a secure storage of Node 2.

In operation 301, Accelerator 1 generates a derived asymmetric key pair, PK_D1 and SK_D1, from rooted key pair PK_RK1 and SK_RK1. Deriving an asymmetric key pair is known in the art and will not be described herein. In operation 302, Accelerator 1 sends to Node 2, a "Get Public Key" command (GET_PUB_KEY) to request a public key of Node 2. The GET_PUB_KEY command includes encrypting two of Accelerator 1's public keys: PK_RK1 and PK_D1. In an embodiment, PK_RK1 and PK_D1 can be encrypted using Accelerator 1's private rooted key SK_RK1. The GET_PUB_KEY command further includes Accelerator 1's public rooted key, PK_RK1 in clear-text form. Node 2 can decrypt Accelerator 1's encrypted keys using PK_RK1 and verify that the GET_PUB_KEY request did, in fact, come from Accelerator 1.

In operation 303, Node 2 generates a derived asymmetric key pair PK_D2 and SK_D2 from Node 2's rooted key pair PK_RK2 and SK_RK2. Derived keys PK_D2 and SK_D2 can be stored in secure storage at Node 2. In operation 304, Node 2 can decrypt the received "GET_PUB_KEY" command received from Accelerator 1, using the clear-text public rooted key of Accelerator 1: PK_RK1. Once decrypted, Node 2 obtains Accelerator 1's derived public key: PK_D1. In operation 305, Node 2 sends to Accelerator 1 a "Return Public Key" (RET_PUB_KEY) message. The message includes Node 2's PK_RK2 and PK_D2, encrypted using Node 2's private rooted key, SK_RK2. Node 2's public rooted key PK_RK2 is packaged with the encrypted keys PK_RK2 and PK_D2, and packaged keys are then encrypted using Accelerator 1's derived public key PK_D1.

In operation 306, Accelerator 1 decrypts the RET_PUB_KEY message using Accelerator 1's private derived key SK_D1. After decryption, Accelerator 1 can obtain Node 2's public rooted key, PK_RK2. Accelerator 1 then decrypts the encrypted keys PK_RK2 and PK_D2 using Node 2's newly-obtained public rooted key, PK_RK2. Accelerator 1 can then obtain Node 2's derived public key, PK_D2. In an embodiment, Accelerator 1 can verify PK_RK2 either, or both, the decrypted PK_RK2 and clear-text PK_RK2 by checking with the host device or a history copy of PK_RK2.

In operation 307, Accelerator 1 can generate a nonce, "nc1." In operation 308, Accelerator 1 can send a command "Generate Session Key" (CMD_SESS_KEY) to Node 2. The command includes nonce nc1, encrypted using Node 2's public derived key PK_D2. CMD_SESS_KEY instructs Node 2 to generate a session key from Accelerator 1's nonce nc1 and a nonce nc2 that is generated by Node 2. In operation 309, Node 2 can decrypt nonce nc1 in the received CMD_SESS_KEY using Node 2's private derived key SK_D2.

In operation 310, Node 2 can generate a nonce, nc2. Node 2 can then generate a session key, based on nonces nc1 and nc2. Node 2 stores the session key in an adjacency table of Node 2. The session key is stored in association with Accelerator 1 and a unique identifier of Accelerator 1. In operation 311, Node 2 can send nonce nc2 to Accelerator 1. Node 2 packages nc1, nc2, and PK_D1 in a first package and encrypts the first package using Node 2's private derived key, SR_D2. Node 2 then adds PK_D2 to the encrypted first package, and generates a second encrypted package that is encrypted using Accelerator 1's public derived key, PK_D1. The encrypted second package is then transmitted to Accelerator 1.

In operation 312, Accelerator 1 receives the encrypted second package from Node 2 and decrypts the second package using Accelerator 1's derived private key, SK_D1. Accelerator 1 can then remove PK_D2 from the decrypted second package, leaving just the encrypted first package. In an embodiment, Accelerator 1 can verify that PK_D2 removed from the decrypted second package matches the PK_D2 previously received in operation 305 and decrypted in operation 306, above. Accelerator 1 can also verify that the nc1 obtained from the decrypted first package, and previously sent to Node 2 in operation 308, has not expired (aka, "verify freshness" of nonce). Accelerator 1 can then generate a session key based upon nonces nc1 and nc2. Accelerator 1 can store the generated session key in Accelerator 1's adjacency table, in association with a unique identifier of the Node 2 and the session key.

At this point, both Accelerator 1 and Node 2 have a same session key that was derived from nonces nc1 and nc2. Both Accelerator 1 and Node 2 have stored the session key in their respective adjacency tables. Adjacency tables are described in detail, below, with reference to FIG. 5.

Figure 4:
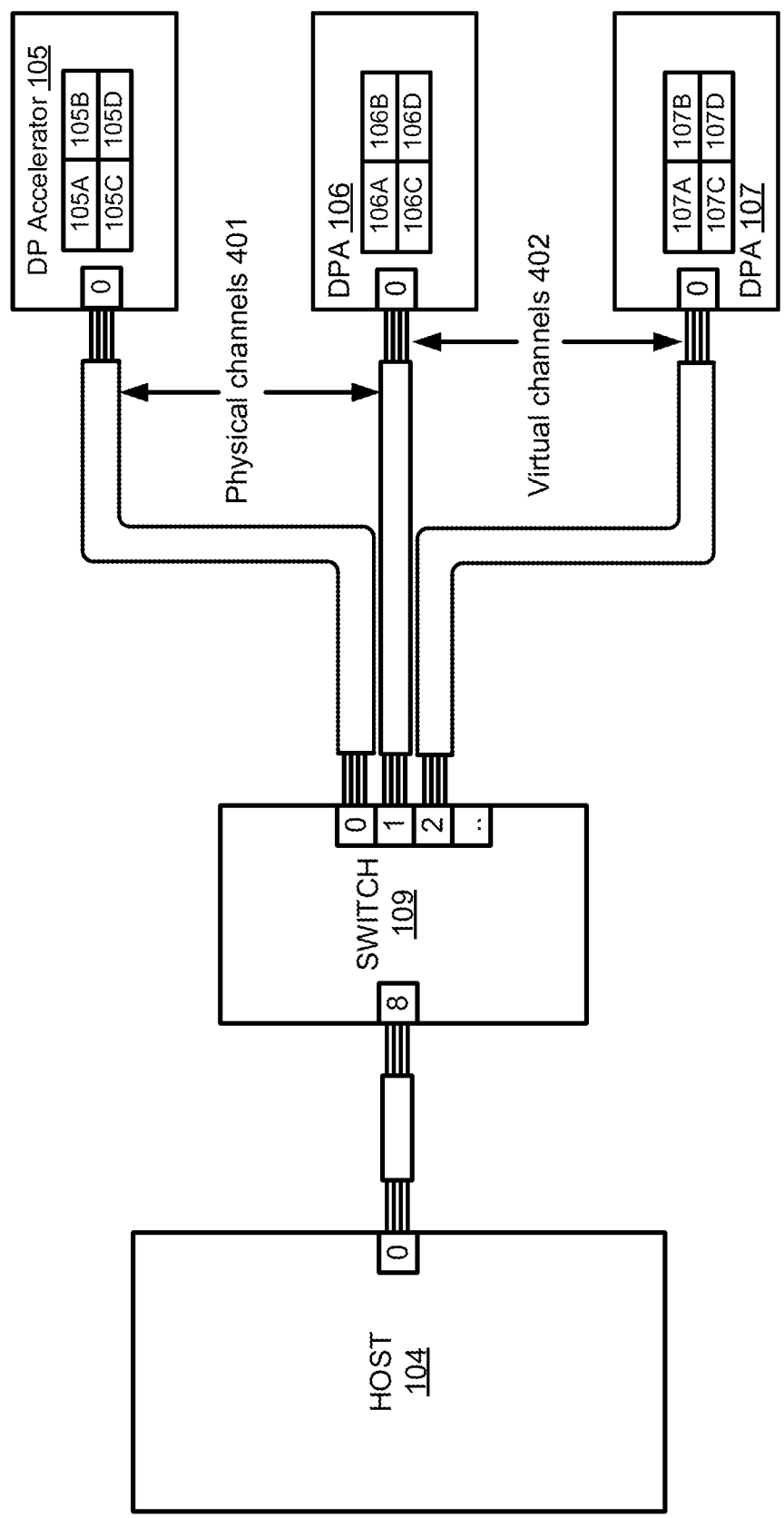
FIG. 4 is a block diagram illustrating a hardware configuration of a host computing device and a plurality of data processing accelerators which each comprise a plurality of virtual data processing accelerators that securely communicate with one another, according to an embodiment.

FIG. 4 is a block diagram illustrating a hardware configuration 400 of a host computing device 104 and a plurality of data processing (DP) accelerators 105-107 communicatively coupled to the host via a switch 109. Each DP accelerator, e.g. 105, can be configured as a plurality, e.g. four, virtual data processing (VDP) accelerators 105A-105D. Each VDP accelerator of a DP accelerator can communicate with another VDP accelerator of a different DP accelerator via a virtual communication channel 402. For example, VDP accelerator 105A can be configured to communicate with host 104 and VDP accelerators 106A and 107A, via switch 109. VDP accelerator 105B can be configured to communicate with host 104 and VDP accelerators 106B and 107B. VDP accelerator 105C can be configured to communicate with host 104 and VDP accelerators 106C and 107C. VDP accelerator 105D can be configured to communicate with host 104 and VDP accelerators 106D and 107D. These are just example configurations. In an embodiment, any VDP accelerator can be configured to communicate with any other VDP accelerator, via a virtual communication channel 402 of switch 109.

To implement a configuration, each of the host 104 and the DP accelerators 105-107 can generate one or more adjacency tables that indicate the VDP accelerators configured within a DP accelerator. The VDP accelerators in a DP accelerator can each also have an adjacency table that indicates the other VDP accelerators that each VDP accelerator can communicate with, and a session key that is used to secure the communications over the virtual communication channel 402.

Host 104 is communicatively coupled to each of DP accelerator 105, 106, and 107. DP accelerator 105 is communicatively coupled to DP accelerator 106 and 107, via switch 109. Host 104 includes a communication interface having one or more ports communicatively coupled to switch 109. In FIG. 4, DP accelerator 105's communication port 0 is communicatively coupled to switch 109's communication port 0. DP accelerator 106's communication port 0 is communicatively coupled to switch 109's communication port 1. DP accelerator 107's communication port 0 is communicatively coupled to switch 109's communication port 2. DP accelerator's 105-107 are also communicatively coupled to each other, via switch 109.

Each communicatively coupled pair of physical ports, above, defines a physical communication channel 401. Each physical communication channel 401 can be divided into a plurality of virtual communication channels 402. The number of virtual communication channels 402 per physical channel 401 can be greater than or equal to a number of VDP accelerators for which a DP accelerator is configured. For example, if DP accelerator 105 is configured with four virtual DP accelerators, then communication port 0 of DP accelerator 105 can each be configured with four or more virtual communication channels 402, such that there is a virtual communication channel 402 associated with each virtual VDP accelerator 105A-105D of DP accelerator 105. One or more additional virtual communication channels 402 may be configured between host 104, and any of the DP accelerators 105-107, or between any of the DP accelerators 105-107, via switch 109.

Such additional virtual communication channels 402 can be used to transmit out-of-band information between host 104 and DP accelerators, or between DP accelerators. In an embodiment, host 104 may communicate with DP accelerator 105 to transmit configuration information to DP accelerator 105, including an instruction that DP accelerator 105 is to configure itself for an identified number of VDP accelerators, each VDP accelerator being assigned to one or more virtual communication channels 402. Each virtual communication channel 402 can have a different session key than any other of the virtual of the virtual communication channels 402. Host 104 similarly instructs the other DP accelerators (106, 107, et al.) to configure themselves, and their VDP accelerators and virtual communications channels, as described above for DP accelerator 105.

Each of the foregoing virtual communication channels 402 can be secured by a different session key than for the other virtual communication channels 402. Thus, if any one of the virtual communication channels 402 is compromised, the other virtual communication channels 402 are still secure. Each DP accelerator 105-107 can monitor its own physical communication channels 401 to ensure that the each communication channel 401 is operable. Each virtual DP accelerator can also monitor the virtual communication channels 402 to which the virtual DP accelerator is connected, to ensure that each virtual communication channel 402 is operable. If a virtual communication channel 402 fails, the VDP accelerator that detects the failure can notify the DP accelerator in which the VDP accelerator is configured about the failure. The DP accelerator can then notify the host 104 of the failure using one of the additional virtual communications channels 402 that is reserved for out-of-band communications. Out-of-band communications are those communications that are for purposes other than for work-related communications between host 104 and a VDP accelerator, or between two VDP accelerators.

Each of the host 104, and virtual DP accelerator 105A-D, 106A-D, and 107A-D, can have an adjacency table that stores a list of nodes (host or VDP accelerators) that the host 104 or VDP accelerator 105A-D, 106A-D, or 107A-D is communicatively coupled to. Adjacency tables are described below with reference to FIG. 5.

FIGS. 5A and 5B are block diagrams illustrating secure communications adjacency table 500 between and host 104 and a plurality of virtual DP accelerators (VDP accelerators). FIG. 5A illustrates an exemplary adjacency table 510 for switch 109. FIG. 5B illustrates two exemplary adjacency tables 520 and 521 for VDP accelerators 105B and 106B, respectively.

As described above with reference to FIG. 4, each DP accelerator can be configured to have a plurality of virtual data processing (VDP) accelerators. VDP accelerators communicate with host 104, and with other VDP accelerators of other DP accelerators via virtual communication channels 402 implemented over physical communication channels 401 between communication ports of the switch 109 and DP accelerators. In an embodiment, host 104 and switch 109 can implement virtual communications channels between the host and switch, but this need not be the case. Host 104 and switch 109 can implement physical or virtual communication channels over a bus, physical ports, or other mechanism. Switch 109 implements virtual communication channels between switch 109 and VDP accelerators.

Host 104, e.g., can have an adjacency table 500 that lists the DP accelerators and VDP accelerators that are communicatively coupled to host 104. DP accelerators 105-107 and VDP accelerators, e.g. 105A-105D, 106A-106D and 107A-107D, can each have a unique virtual device ID (VID) 501, e.g. VDP_105A_ID, etc., so that the VDP accelerator can be referred to by name. In an embodiment, when a host wants to send a message to a VDP accelerator, the message can have the format [source, message_payload, destination]. Message can be any payload specified by the sender. Example payloads include instructions to a VDP accelerator to configure itself for secure communications with another node (host or VDP accelerator. Payload can include a computational task transmitted from a VDP accelerator to another VDP accelerator. A payload can include the another VDP accelerator sending a result back to the VDP accelerator that assigned the another VDP accelerator a task. Payload can also be any out-of-band communications between host and VDP accelerator or between two VDP accelerators. Out of band communications can be any communication that is not related to performing end-user or application processing work.

Host, as the sender (source) can refer to itself by its own VID 501 e.g. HOST_104_ID. Host 104 can refer to a destination VDP accelerator by its unique VID 501, e.g. VDPA_106B_ID. Host can look up the VID 501 of the destination VDP accelerator, e.g. VPDA_106B_ID, to find the session key corresponding to VDPA_106B_ID, and encrypt the message payload with the session key. When switch 109 receives a message from host 104 that is destined for a VDP accelerator, switch 109 can use switch adjacency table 510 to lookup the VID 501 of destination, e.g. VDPA_106B_ID, to find the virtual channel 503 of switch 109 for VDPA_106B_ID, and forward the message to VDPA 106B over the virtual communication channel to the destination VDP accelerator.

The host adjacency table 500 can further include context information 505 related to the host and a particular VDP accelerator that is communicatively coupled to the host via a virtual communication channel 402. Context information can include an identifier of a host process ("Host_Proc_ID") that has called the VDP accelerator to perform work on behalf of the host 104. Context information can further an identifier of a process on the VDP accelerator (e.g. "VDPA_Proc_ID") that is performing the work on behalf of the host 104. Context information can also include a status of the host process, e.g. "waiting on results from VDP accelerator process" and/or a status of the VDP accelerator process that is performing work on behalf of the host 104, e.g. "waiting on VDP accelerator 106B sub-task results," or other status. Context information can further include an identifier of a user (User_ID) associated with the host process. Collectively, the context information can be used to answer a user query at the host, such as "What is the status of the artificial intelligence (AI) model inference that I requested?" Logic on host 104 can query the adjacency table to find context information for the user having a particular User_ID, then determine a status of each VDP accelerator and related process(es) that are performing the AI model inference for the user. Determining such statuses can include out-of-band queries of one or more VDP accelerators to determine whether a particular sub-task of a process has failed at a particular VDP accelerator. Other context information can be generated that can be used to aid in diagnosing performance of one or more processing tasks by one or more VDP accelerators on behalf of a caller, e.g. Host 104, to the one or more VDP accelerators.

In an embodiment, a host delegates work to a single VDP accelerator with instructions to delegate one or more sub-tasks of the work to one or more VDP accelerators. In an embodiment, the single VDP accelerator can determine idle VDP accelerators that can perform the one or more sub-tasks and VDP can determine the particular sub-tasks to delegate to the idle VDP accelerators. In an embodiment, host 104 can provide the single VDP accelerator with instructions on which VDP accelerator(s) to delegate the one or more sub-tasks to, and the single VDP accelerator can override the instructions of the host in favor of the single VDP accelerator determining that one or more VDP accelerator are currently idle and available.

Similar to host 104, switch 109 can have an adjacency table 510 that maps DP accelerators and VDP accelerators to virtual communication channels. Each line item in the switch adjacency table 510 can include a virtual device ID 501 of a node (host, DP accelerator, or VDP accelerator), a physical communication port 502, and a virtual communication channel 503. For example, as shown in switch adjacency table 510, DP accelerator 105 can have a VID of DPA_105_ID. DP accelerator 105 can be mapped to a physical port 0 of switch 109, and mapped specifically to a virtual channel, e.g., 0.0 ("$0^{th}$ virtual channel on physical channel 0") of switch 109. Host 104 can send a message containing an instruction to DP accelerator 105 that DP accelerator 105 is to configure four virtual DP accelerators 105A-105D. Switch 109 receives the message, looks up DPA_105_ID in switch adjacency table 510 and transmits the message to destination DP accelerator 105 over virtual channel 0.0 of physical port 0 of switch 109.

Similar to host 104, DP accelerator, e.g. DP accelerator 105, can have a plurality of adjacency tables 510A-510D, one for each of the VDP accelerators 105A-105D of DP accelerator 105. In FIG. 5B, example VDP accelerator adjacency tables 521 and 522 are shown for VDP accelerators 105B and 106B, respectively. VDP accelerators adjacency tables for any other VDP accelerators (105A, 105C-D, 106A, 106C-D, and 107A-107D) are similarly derived. The adjacency table 521 for VDP accelerator 105B can include an endpoint virtual ID 511 (e.g. HOST_104_ID, or adjacent VDP accelerators VDPA_106B_ID and VDPA_107B_ID), and a session key 514 to use when communicating over the virtual communication channel with the adjacent node having VID 511. The adjacency table for VDP 106B, shown in FIG. 5B as 522, is similarly derived.

Each adjacency table, e.g. 521, can also have context information, e.g., 505 for processing task(s) that may be executing within an adjacent VDP accelerator. Context information 505 can include, e.g., an identification of the node (host or VDP accelerator) that called the VDP accelerator, e.g. host 104 called VDP accelerator 105A. Context information 505 can also include a caller status of a process and of a node (host 104 or VDP accelerator) that called the VDP accelerator, e.g.: Host 104_ID:Process_ID indicate that a process identified by Process_ID called e.g. VDP accelerator 105B, and is waiting on a response to the call. VDP accelerator 106B may have been called by VDP accelerator 105B to perform work that forms a sub-task of the processing task that VDP accelerator 105B is performing for a calling process Host_104_ID:Process_ID. The caller status of VDP accelerator 105B, with respect to called VDP accelerator 106B, is that VDP accelerator 105B is waiting on results to be returned from VDP accelerator 106B before VDP accelerator 105B can return results to Host_104_ID: Process_ID. VDP accelerator 107B, which is adjacent to VDP accelerator 105B, may be idle and thus have no identified caller.

Session keys can be generated for each virtual communication channel 402 between two nodes (host 104 to VDP accelerator, or VDP accelerator to VDP accelerator). Generating session keys between two nodes is described above with reference to FIG. 3, and a method is described below with reference to FIG. 6. A session key of NULL indicates that the session key has not yet been determined between the two nodes referenced in the line item of the adjacency table having the NULL session key. When a DP accelerator receives, from host 104, an instruction and configuration information to configure VDP accelerators upon the DP accelerator, and to generate an adjacency table for each VDP accelerator, the session key field for each line item is initially set to NULL. When the session key is generated for the line item in the adjacency table, the NULL is replaced with the generated session key. When all session keys have been generated for all line items of adjacency tables in all VDP accelerators of a DP accelerator, then the DP accelerator can send an indication to the host 104 that the DP accelerator and its respective VDP accelerators are ready to receive processing tasks. When all DP accelerators send such an indication to the host 104, then host 104 can use all configured VDP accelerators to perform processing tasks.

Figure 6:
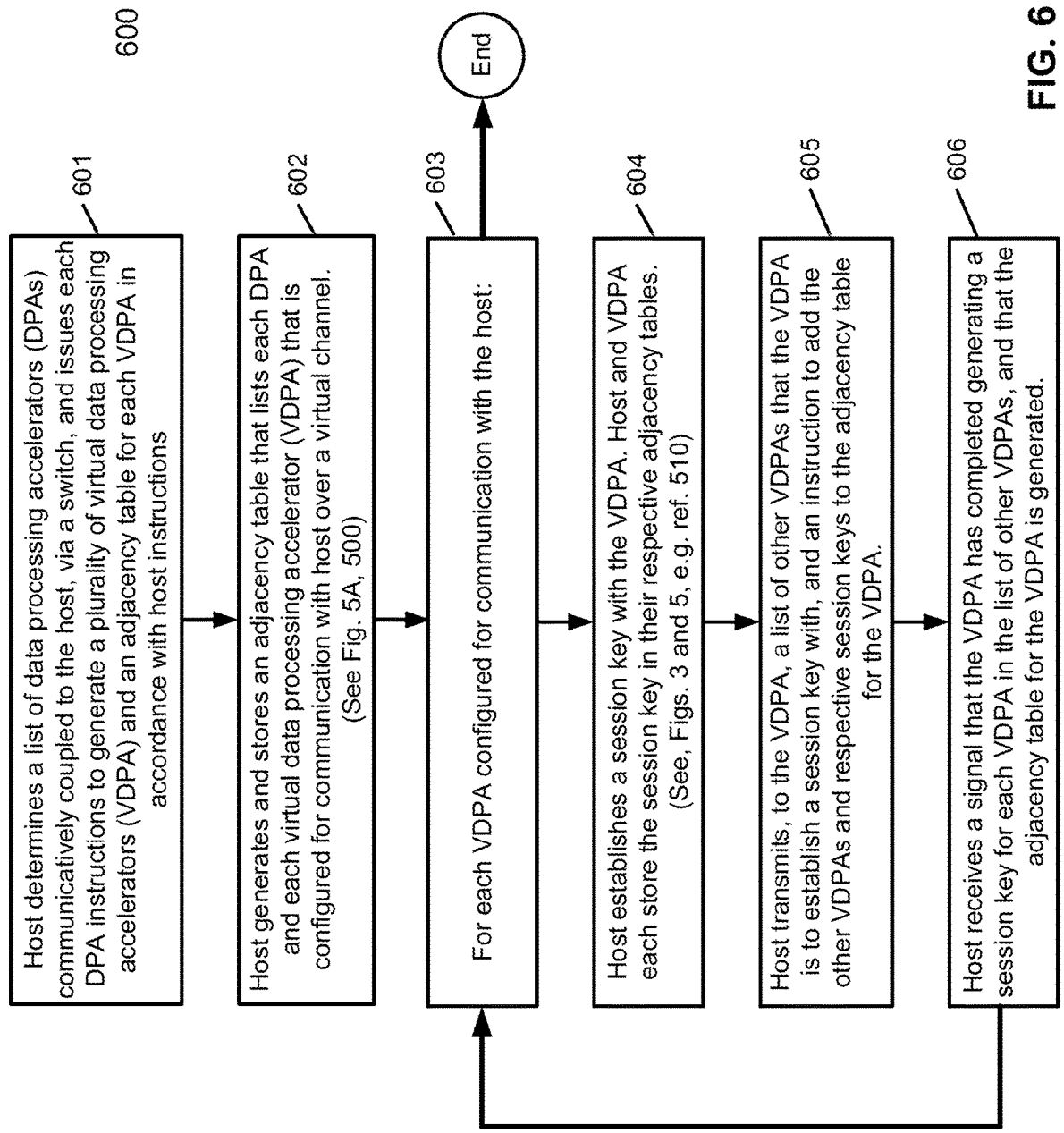
FIG. 6 is block diagrams illustrating a method of a host device instructing a plurality of virtual data processing accelerators to configure themselves for secure communications via a switch, according to an embodiment.

FIG. 6 is block diagrams illustrating a method 600 of a host device instructing a plurality of virtual data processing accelerators to configure themselves for secure communications, according to an embodiment.

In operation 601, the host device determines a list of data processing accelerators (DPAs) that are communicatively coupled to communication ports of the host. The determination can be made from, e.g., an administrator's configuration file that lists the DPA identifiers of the DPAs. The host can then send an instruction, and optionally configuration information, that instructs each DPA to configure itself to have a plurality of virtual data processing accelerators (VPDA) and to generate an adjacency table (e.g. FIG. 5, table 521 or 522) for each VDPA in the DPA.

In operation 602, a host, e.g. host 104, generates and stores an adjacency table that lists each virtual data processing accelerator (VDPA) that is configured for communication over a virtual communication channel with the host. In an embodiment, one or more VDP accelerators can be configured by a system administrator using a configuration file. The configuration file can indicate which VDP accelerators can communicate with which other VDP accelerators. The configuration file can specify the unique identifier for the host and VDP accelerators, the specific communication port number to which each DP accelerator is assigned, and a virtual communication channel of the specific communication port for communicating with the VDP accelerator. There can be any number of VDP accelerators. For simplicity, one host, 104, and three DP accelerators, e.g. 105-107, are described, with each DP accelerator being configured for four VDP accelerators. The description of three DP accelerators each having four VDP accelerators is exemplary and non-limiting. A system can be configured with any number of hosts, and any number of DP accelerators, each DP accelerator being configured for any number of VDP accelerators. The generated adjacency table for the host can be similar to host table 500, described above with reference to FIG. 5.

In operation 603, logic in the host can iterate through the list of VDP accelerators configured for communication with the host, over virtual communication channels of switch 109. For each VDP accelerator, operations 604 through 606 can be performed. If there are no more VDP accelerators in the list, then method 600 ends.

In operation 604, host selects a VDP accelerator from the list and generates a session key with the selected VDP accelerator. Generating a session key between a VDP accelerator and a host (Node) is described above with reference to FIG. 3. Host stores the generated session key in an entry in the host adjacency table corresponding to the selected VDP accelerator. Host uses information in the administrator configuration file to complete the line item of entry in the adjacency table for the selected VDP accelerator, including the unique identifier of the VDP accelerator, along with any relevant context information for the selected VDP accelerator, if any.

In operation 605, host transmits instructions to the selected VDP accelerator for the VDP accelerator to create its own adjacency table. The information in the host-transmitted instructions can be obtained from the administrator configuration file. The instructions include a list of other VDP accelerators that the selected VDP accelerator is to include when the selected VDP accelerator generates its own adjacency table. The instructions can further include a unique identifier of each of the other VDP accelerators and the generated session key. The VDP accelerator stores the generated session key for each VDP accelerator in its own line item in the adjacency table, associated with the VDP identifier (e.g. 511 of FIG. 5) of the each VDP accelerator. The instructions further include an instruction that the selected VDP accelerator is to generate and store a session key with each of the other VDP accelerators in the adjacency table of the selected VDP accelerator. A method for a selected VDP accelerator to generate its own adjacency table is described below with reference to FIG. 7.

In operation 606, host receives a signal from the selected VDP accelerator that the selected VDP accelerator has generated its own adjacency table, populated the adjacency table with the information provided in operation 605, above, and has generated and stored a session key for each of the other VDP accelerators in the selected VDP accelerator's adjacency table. In an embodiment, a DP accelerator can monitor the completion of operations 603-605, and when operations 603-605 are complete for all VDP accelerators configured for a DP accelerator, then the DP accelerator can send a single message to the host that each of the VDP accelerators of the DP accelerator are configured and have session keys. Method 600 continues at operation 603.

Figure 7:
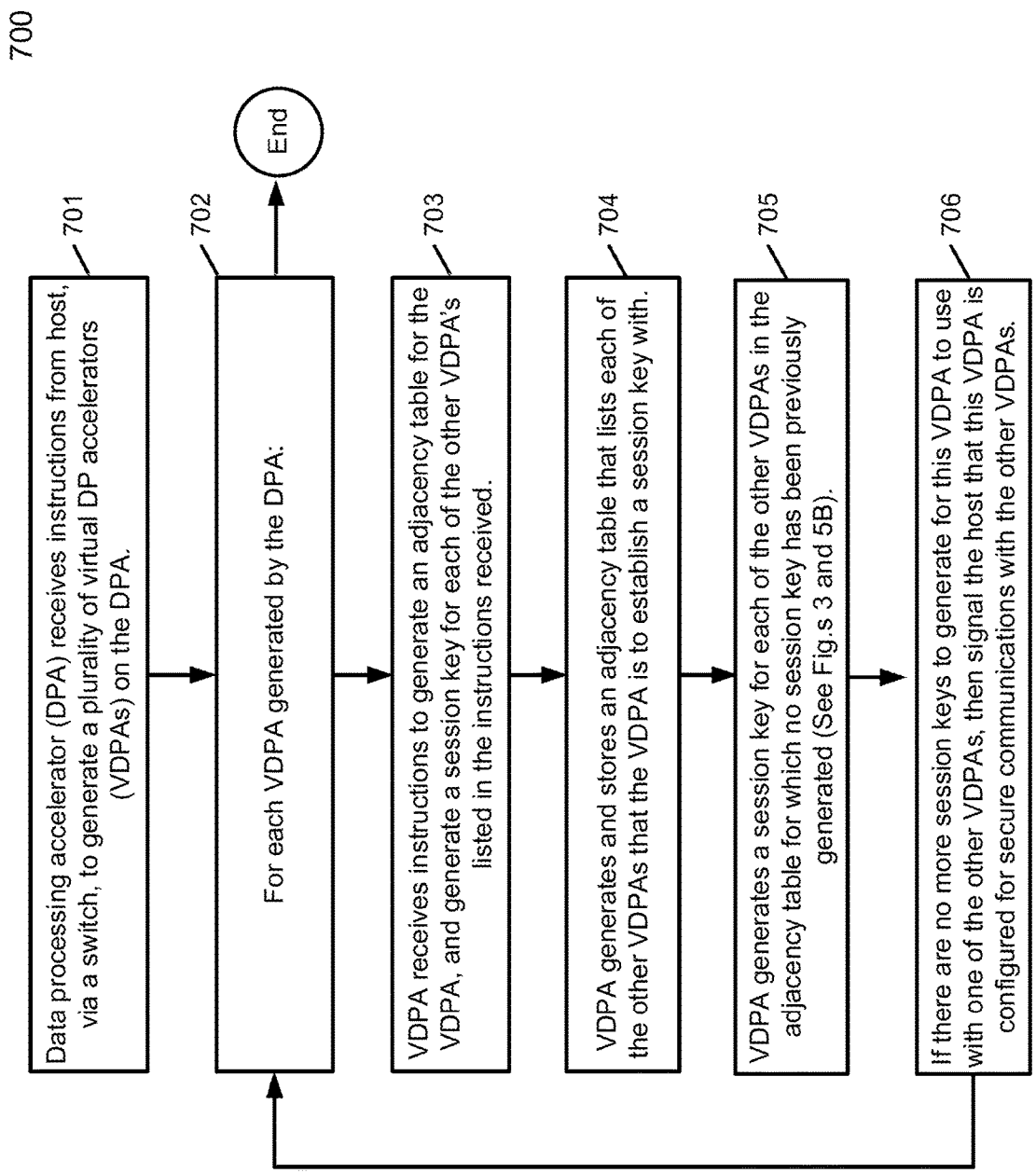
FIG. 7 is a block diagram illustrating a method of a virtual data processing accelerator configuring itself for secure communication with one or more other data processing accelerators, via a switch, according to an embodiment.

FIG. 7 is a block diagram illustrating a method 700 of a virtual data processing accelerator configuring itself for secure communication with one or more other virtual data processing accelerators, according to an embodiment. In operation 701, a DP accelerator receives instructions from a host device to generate a plurality of virtual DP accelerators (VDP accelerators) and to generate an adjacency table of communicatively connected nodes (host or VDP accelerators) for each of the generated VDP accelerators. Exemplary adjacency tables are described above with reference to FIG. 5. The information in the host-transmitted instructions can be obtained by the host from an administrator-created configuration file. In an embodiment, the instructions can be default instructions.

In operation 702, for each of the VDP accelerators generated by the DP accelerator, the VDP accelerator is selected and DP accelerator logic performs, or causes the selected VDP accelerator to perform, the following operations 703 through 706. When there are no more VDP accelerators to process, then method 700 ends.

In operation 703, the selected VDP accelerator receives instructions to generate an adjacency table for the selected VDP accelerator, the adjacency table listing a plurality of nodes (host or other VDP accelerators) that the selected VDP is communicatively coupled to via a virtual communication channel between the selected VDP accelerator and one of the plurality of nodes. The selected VDP accelerator further receives an instruction to generate a session key with each of the plurality of nodes.

In operation 704, the VDP accelerator generates and stores and adjacency table for the selected VDP accelerator in accordance with the received instructions in operation 703. As described above, in FIG. 5, the adjacency table can include a line item entry for each of the other nodes (host or VDP accelerators) to which the selected VDP accelerator is communicatively coupled. Information for each line item entry can include a virtual device identifier (VID, e.g. FIG. 5, table 510A, VID 511A), a communication port of the selected DP accelerator corresponding to a physical port, e.g. 512A of FIG. 5, of the DP accelerator that is hosting the selected VDP accelerator, a virtual communication channel identifier, e.g. 513A of FIG. 5, and a session key field for storing a session key generated for communication between the selected VDP accelerator one of the other nodes.

In operation 705, the selected VDP accelerator generates a session key for each of the other nodes (host or VDP accelerators) that are configured for communication with the selected VDP accelerator. The session key is stored in a line item entry of the adjacency table of the selected VDP accelerator, the line item entry associated with the node. The selected VDP accelerator generates a different session key between the selected VDP accelerator and each of the other adjacent nodes (host or VDP accelerator) to the selected VDP accelerator. The session key is for use in communicating between the selected VDP accelerator and one of the other nodes. Generating a session key between a VDP accelerator and a node (host or VDP accelerator) is described above with reference to FIG. 3. VDP accelerator logic stores the session key in its adjacency table for the selected VDP accelerator, in association with the selected VDP accelerator.

In operation 706, if there are no more VDP accelerators to be configured for the DP accelerator, and thus there are no more session keys to generate for the VDP accelerators of the DP accelerator, then the DP accelerator transmits a message or signal to the host that the DP accelerator has finished configuring VDP accelerators and generating adjacency tables for the VDP accelerators and session keys for secure communication with each of the other VDP accelerators in the adjacency tables. In an embodiment, each session key in the adjacency table is different than other session keys in the adjacency table. In an embodiment, each configured VDP accelerator of the DP accelerator separately notifies the host 104 that the VDP accelerator has been configured and a session key generated for the VDP accelerator. In an embodiment, each configured VDP accelerator notifies the DP accelerator which is hosting the VDP accelerator, that the VDP accelerator is configured and a session key has been generated for the VDP accelerator. Then the DP accelerator notifies the host 104 when all VDP accelerators of the selected DP accelerator are configured and a session key is generated. Method 700 continues at operation 702.

Figure 8:
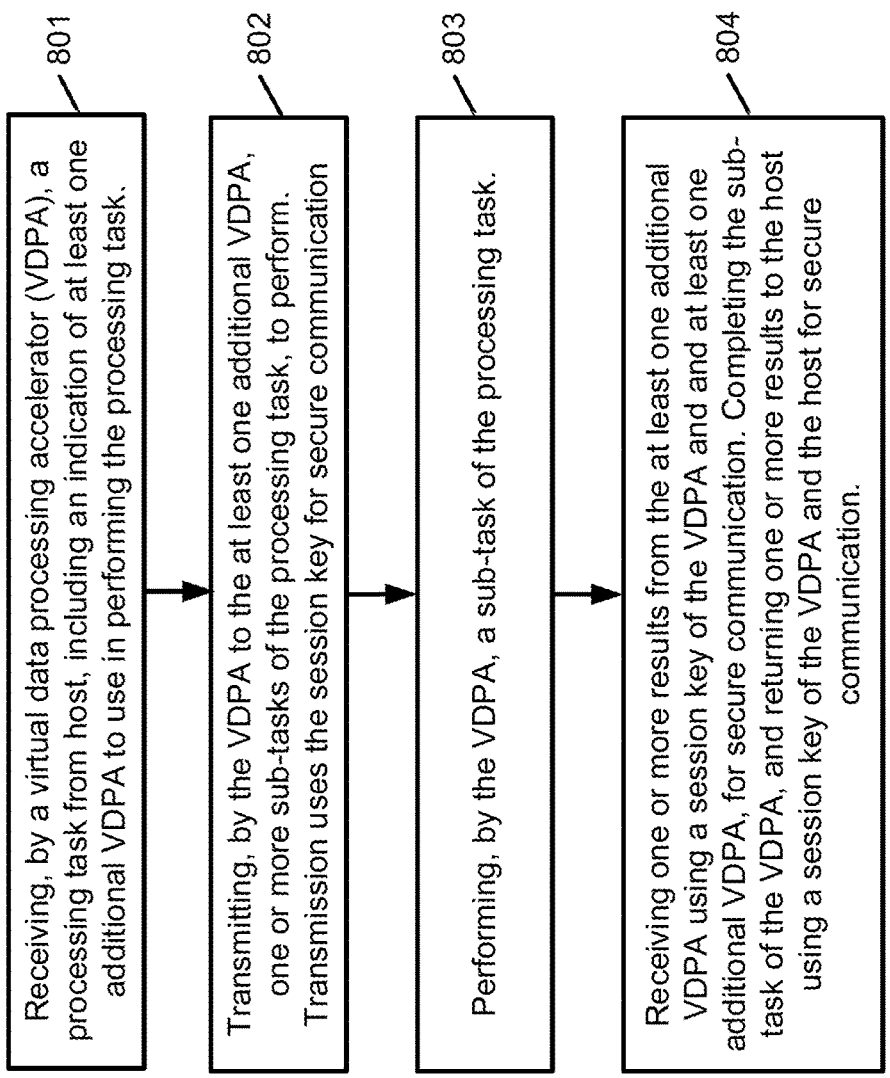
FIG. 8 is block diagram illustrating a method of a virtual data processing accelerator receiving a processing task from a host and performing one or more sub-tasks of the tasks by one or more additional virtual data processing accelerators, according to an embodiment.

FIG. 8 is block diagram illustrating a method 800 of a virtual data processing (VDP) accelerator receiving a processing task from a host and performing one or more sub-tasks of the tasks by one or more additional VDP accelerators, according to an embodiment.

In operation 801, a VDP accelerator receives a processing task from a host device. In an embodiment, the processing task includes instructions on dividing the processing task into sub-tasks that are to be processed on at least on additional VDP accelerator, and the VDP accelerator has an entry in the adjacency table of the VDP accelerator for securely communicating with the at least one additional VDP accelerator. In this embodiment, it is assumed that host has determined that the at least one additional VDP accelerator is, or soon will be, idle such that the at least one additional VDP accelerator can perform one or more sub-tasks on behalf of the VDP accelerator.

In operation 802, the VDP accelerator transmits one or more sub-tasks to the at least one additional VDP accelerator with instructions to perform the sub-task(s). A message transmitting the one or more sub-tasks is secured using a session key generated for use between the VDP accelerator and the at least one additional VDP accelerator. The at least one additional VDP accelerator performs the one or more sub-tasks.

In operation 803, the VDP accelerator also performs one or more sub-tasks of the received processing task. In operation 804, the VDP accelerator receives one or more results from the at least one additional VDP accelerator. The VDP accelerator completes its one or more sub-tasks of the processing tasks, and returns, to the host, one or more results from the one or more sub-tasks perform by the VDP accelerator and the one or more sub-tasks performed by the at least one additional DP accelerator. Method 800 ends.

With respect to any of the above aspects, a host processor may be a central processing unit (CPU) and a DP accelerator may be a general-purpose processing unit (GPU) coupled to the CPU over a bus or interconnect. A DP accelerator may be implemented in a form of an application-specific integrated circuit (ASIC), a field programmable gate array (FPGA) device, or other forms of integrated circuits (ICs). Alternatively, the host processor may be a part of a primary data processing system while a DP accelerator may be one of many distributed systems as secondary systems that the primary system can offload its data processing tasks remotely over a network (e.g., cloud computing systems such as a software as a service or SaaS system, or a platform as a service or Paas system). A link between a host processor and a DP accelerator may be a peripheral component interconnect express (PCIe) link or a network connection such as Ethernet connection.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of a first virtual data processing (VDP) accelerator securely communicating with one or more second VDP accelerators via a switch, the method comprising:
receiving, by the first VDP accelerator, from a host device, via a first virtual communication channel of the switch, a list of the one or more second VDP accelerators;
for each of the one or more second VDP accelerators, determining a session key between the first VDP accelerator and the second VDP accelerator, wherein the first VDP accelerator uses at least the first virtual communication channel of the switch and a second virtual communication channel of the second VDP accelerator to communicate with the second VDP accelerator when establishing the session key, wherein the second virtual communication channel is determined by the switch, wherein the first VDP accelerator verifies a public key obtained from the second VDP accelerator by checking with the host device when determining the session key; and transmitting, by the first VDP accelerator, to the host device, via the first virtual communication channel of the switch, an indication that the first VDP accelerator is configured for secure communication with each of the one or more second VDP accelerators, wherein the first VDP accelerator and each of the one or more VDP accelerators communicate securely via the switch.

2. The method of claim 1, further comprising generating, by the first VDP accelerator, an adjacency table with an entry for each of the one or more second VDP accelerators, each entry comprising a unique identifier of one of the one or more second VDP accelerators, and a session key association with the one of the one or more second VDP accelerators.

3. The method of claim 1, wherein the session key generated for the first VDP accelerator and the one of the one or more second VDP accelerators is unique with respect to the first VDP accelerator and any other of the one or more second VDP accelerators.

4. The method of claim 1, wherein each entry for one of the one or more second VDP accelerators further includes a unique identifier of the one of the one or more second VDP accelerators.

5. The method of claim 1 further comprising:
receiving, by the first VDP accelerator, from the host device, via the first virtual communication channel of the switch, a processing task to perform, and an indication of one of the one or more second VDP accelerators to perform at least a portion of the processing task; and
instructing, by the first VDP accelerator, via the second virtual communication channel of the switch, the one of the one or more second VDP accelerators to perform the at least a portion of the processing task, using a message that is secured with the session key associated with the first VDP accelerator and the one of the one or more second VDP accelerators.

6. The method of claim 5, further comprising:
receiving, by the first VDP accelerator, via the first virtual communication channel of the switch, from the one of the one or more second VDP accelerators, a message secured using the session key associated with the first VDP accelerator and the one of the one or more second VDP accelerators, the message comprising a result from the at least a portion of the task; and
returning, by the first VDP accelerator, to the host device, via the first virtual communication channel of the switch, a message containing a result of the processing task, the message secured using a session key that is associated with the first VDP accelerator and the host device.

7. The method of claim 1, wherein communication between the first data processing accelerator (DPA) and the second DPAs is encrypted with a session key that is not known to, or accessible by, the switch.

8. A non-transitory machine-readable medium having instructions stored therein, which when executed by a processor, cause the processor to perform operations of a first virtual data processing (VDP) accelerator securely communicating with one or more second VDP accelerators via a switch, the operations comprising:
receiving, by the first VDP accelerator, from a host device, via a first virtual communication channel of the switch, a list of the one or more second VDP accelerators;
for each of the one or more second VDP accelerators, determining a session key between the first VDP accelerator and the second VDP accelerator, wherein the first VDP accelerator uses at least the first virtual communication channel of the switch and a second virtual communication channel of the second VDP accelerator to communicate with the second VDP accelerator when establishing the session key, wherein the second virtual communication channel is determined by the switch, wherein the first VDP accelerator verifies a public key obtained from the second VDP accelerator by checking with the host device when determining the session key; and
transmitting, by the first VDP accelerator, to the host device, via the first virtual communication channel of the switch, an indication that the first VDP accelerator is configured for secure communication with each of the one or more second VDP accelerators, wherein the first VDP accelerator and each of the one or more VDP accelerators communicate securely via the switch.

9. The machine-readable medium of claim 8, the operations further comprising generating, by the first VDP accelerator, an adjacency table with an entry for each of the one or more second VDP accelerators, each entry comprising a unique identifier of one of the one or more second VDP accelerators, and a session key association with the one of the one or more second VDP accelerators.

10. The machine-readable medium of claim 8, the operations further comprising:
receiving, by the first VDP accelerator, from the host device, via the first virtual communication channel of the switch, a processing task to perform, and an indication of one of the one or more second VDP accelerators to perform at least a portion of the processing task; and
instructing, by the first VDP accelerator, via the second virtual communication channel of the switch, the one of the one or more second VDP accelerators to perform the at least a portion of the processing task, using a message that is secured with the session key associated with the first VDP accelerator and the one of the one or more second VDP accelerators.

11. The machine-readable medium of claim 10, the operations further comprising:
receiving, by the first VDP accelerator, via the first virtual communication channel of the switch, from the one of the one or more second VDP accelerators, a message secured using the session key associated with the first VDP accelerator and the one of the one or more second VDP accelerators, the message comprising a result from the at least a portion of the task; and
returning, by the first VDP accelerator, to the host device, via the first virtual communication channel of the switch, a message containing a result of the processing task, the message secured using a session key that is associated with the first VDP accelerator and the host device.

12. A data processing system, comprising:
a processor; and
a memory coupled to the processor to store instructions, which when executed by the processor, cause the processor to perform operations of a first virtual data processing (VDP) accelerator securely communicating with one or more second VDP accelerators via a switch, the operations comprising:
receiving, by the first VDP accelerator, from a host device, via a first virtual communication channel of the switch, a list of the one or more second VDP accelerators,
for each of the one or more second VDP accelerators, determining a session key between the first VDP accelerator and the second VDP accelerator, wherein the first VDP accelerator uses at least the first virtual communication channel of the switch and a second virtual communication channel of the second VDP accelerator to communicate with the second VDP accelerator when establishing the session key, wherein the second virtual communication channel is determined by the switch, wherein the first VDP accelerator verifies a public key obtained from the second VDP accelerator by checking with the host device when determining the session key, and
transmitting, by the first VDP accelerator, to the host device, via the first virtual communication channel of the switch, an indication that the first VDP accelerator is configured for secure communication with each of the one or more second VDP accelerators, wherein the first VDP accelerator and each of the one or more VDP accelerators communicate securely via the switch.

13. The system of claim 12, the operations further comprising, generating, by the first VDP accelerator, an adjacency table with an entry for each of the one or more second VDP accelerators, each entry comprising a reference to a unique identifier of one of the one or more second VDP accelerators, and the session key association with the one of the one or more second VDP accelerators.

14. The system of claim 12, wherein the session key generated for the first VDP accelerator and the one of the one or more second VDP accelerators is unique with respect to the first VDP accelerator and any other of the one or more second VDP accelerators.

15. The system of claim 12, wherein each entry for one of the one or more second VDP accelerators further includes a unique identifier of the one of the one or more second VDP accelerators.

16. The system of claim 12, the operations further comprising:
receiving, by the first VDP accelerator, from the host device, via the first virtual communication channel, a processing task to perform and an indication of one of the one or more second VDP accelerators to perform at least a portion of the processing task; and
instructing, by the first VDP accelerator, via the second virtual communication channel of the switch, the one of the one or more second VDP accelerators to perform the at least a portion of the processing task, using a message that is secured with the session key associated with the first VDP accelerator and the one of the one or more second VDP accelerators.

17. The system of claim 16, the operations further comprising:
receiving, by the first VDP accelerator, via the first virtual communication channel of the switch, from the one of the one or more second VDP accelerators, a message secured using the session key associated with the first VDP accelerator and the one of the one or more second VDP accelerators, the message comprising a result from the at least a portion of the task; and
returning, by the first VDP accelerator, to the host device, via the first virtual communication channel of the switch, a message containing a result of the processing task, the message secured using a session key that is associated with the first VDP accelerator and the host device.

18. The system of claim 12, wherein communication between the first data processing accelerator (DPA) and the second DPAs is encrypted with a session key that is not known to, or accessible by, the switch.

19. A processing system, comprising:
one or more processors; and
a memory coupled to the processor to store instructions, which when executed by the processor, cause the processor to perform operations for a host device to configure a plurality of virtual data processing (VDP) accelerators for secure communication, the operations comprising:
for each VDP accelerator in the plurality of VDP accelerators:
establishing a session key between the host device and the VDP accelerator;
storing, by the host device, the session key in an adjacency table for the host device, wherein each entry in the adjacency table includes: the session key and a unique identifier of the VDP accelerator;
transmitting, to the VDP accelerator, via a switch configured with a virtual communication channel to the VDP accelerator, a list of one or more additional VDP accelerators and an instruction that the VDP accelerator generate a unique session key for each additional VDP accelerator for securing communication between the VDP accelerator and the additional VDP accelerator in the list of one or more additional VDP accelerators; and
receiving, from the VDP accelerator, via the switch and virtual communication channel, an indication that the VDP accelerator has finished generating the unique session keys for communicating between the VDP accelerator and the one or more additional VDP accelerators.

20. The system of claim 19, the operations further comprising:
transmitting, to the VDP accelerator, via the switch and virtual communication channel, a processing task for the VDP accelerator and at least one of the one or more additional VDP accelerators to perform, the transmitting secured using the session key established for the host device and the VDP accelerator; and
receiving, from the VDP accelerator, via the switch and virtual communication channel, a result from the processing task, the result secured using the session key established for the host device and the VDP accelerator.

* * * * *